United States Patent

Looschen

[15] 3,668,644

[45] June 6, 1972

[54] FAILSAFE MEMORY SYSTEM

[72] Inventor: Floyd W. Looschen, Arcadia, Calif.

[73] Assignee: Burroughs Corporation, Detroit, Mich.

[22] Filed: Feb. 9, 1970

[21] Appl. No.: 9,817

[52] U.S. Cl. ........ 340/172.5
[51] Int. Cl. ........ G06f 11/00
[58] Field of Search ........ 340/172.5; 235/153

[56] References Cited

UNITED STATES PATENTS

| | | | |
|---|---|---|---|
| 3,460,094 | 8/1969 | Pryor | 340/172.5 |
| 3,252,149 | 5/1966 | Weida et al. | 340/172.5 |
| 3,312,947 | 4/1967 | Raspanti | 340/172.5 |
| 3,409,877 | 11/1968 | Alterman et al. | 340/172.5 |
| 3,436,734 | 4/1969 | Pomerene et al. | 340/172.5 |
| 3,517,171 | 6/1970 | Avizienis | 340/172.5 X |
| 3,517,174 | 6/1970 | Ossfeldt | 340/172.5 X |

*Primary Examiner*—Harvey E. Springborn
*Attorney*—Christie, Parker & Hale

[57] ABSTRACT

A memory system comprising a plurality of memories containing identical information stored at corresponding addresses. Information is requested simultaneously from the memories by a data processor. The requested information is simultaneously supplied to the inputs of a first OR-gate which operates to pass such requested information when it is supplied thereto from any or all of the memories. A plurality of first error detection means are associated with each memory, each operating to disable its associated memory from supplying requested information to the data processor when it detects an error in the information at the memory output, and each operating to send an error signal to the data processor informing it that an error has been detected. Second error detection means are associated with the first OR-gate for detecting an error in the information at its output being sent to the data processor. A second OR-gate couples error signals to the data processor in a manner that a signal, indicating that an error has been detected somewhere in the system, will be supplied to the data processor upon receipt, by the second OR-gate, of an error signal from any or all of the first and second error detection means. Responsive to its receipt of such signal, the data processor is programmed to re-request the originally requested information simultaneously from the memories. Any disabled memory does not respond to such re-request until repaired, updated with information from the other memories, and re-enabled into the system.

8 Claims, 3 Drawing Figures

INVENTOR
FLOYD W. LOOSCHEN
BY
Christie, Parker & Hale
ATTORNEYS

FAILSAFE MEMORY SYSTEM

BACKGROUND OF THE INVENTION

1. Field of the Invention

This invention relates to data processing systems and, more specifically, to a virtual fail-safe memory system therefor.

2. Description of the Prior Art

Redundant memory systems are known which utilize a pair of memories having identically stored information. Each memory, containing a magnetic core memory and address and information registers, is supported by a pair of independent buffer registers when both memories are operating without failure. Write information is supplied simultaneously to the pair of memories through their respective buffer registers. Read information is simultaneously supplied by each memory to its respective buffer register. The output of each buffer register is supplied to memory select logic which selects one of the outputs for application to the data processor.

A pair of error detection logic circuits are respectively associated with the pair of memories. The detection circuits parity-check the memory outputs and, upon detection of an error in parity, send an error signal to the memory select logic. If the memory select logic was originally transmitting the output from the buffer register of the erroneous memory, operation immediately transfers to the "good" memory and the output from the buffer register of the "good" memory alone is supplied to the data processor. Both memories are then regenerated by the buffer register of the "good" memory, thus correcting transient errors. After the error detection logic circuits have verified that the erroneous memory has been corrected, each memory is again controlled by its own buffer register.

Operation is not transferred to the previously erroneous memory until the "good" memory develops its first error. Instantaneous switching from one memory output to another permits uninterrupted data processor operation until simultaneous failures at the same storage location in both memories cause complete system failure. Such a system is shown and described on page 506 of the Proceedings of the Fall Joint Computer Conference, 1964.

The above-described redundant memory system has inherent disadvantages. Since only two memories are used, simultaneous failures at the same storage location in both memories cause complete system failure. In addition, there is only a way of detecting identical information with erroneous parity. There is no way of detecting whether different information with correct parity has been erroneously stored at the same address in both the memories.

SUMMARY OF THE INVENTION

The inherent disadvantages in the above-described redundant memory systems have been substantially eliminated in the redundant memory system according to the present invention. Furthermore, a system has been provided which reduces access time to the storage system due to the elimination of the buffer registers above described.

A plurality of memory modules, not necessarily two, are utilized, each containing identical information stored at identical or corresponding addresses. The number of redundant memory modules can be increased to obtain any desired mean time between failures, i.e. the greater the number of memory modules, the lower the possibility of complete system failure. A data processor simultaneously requests identical information from each of the memory modules. The information thus requested is simultaneously supplied to gating means which "OR"s the corresponding bits together and supplies the information directly to the data processor in a manner such that, to the processor, it appears that only one memory module is responding. Such gating means eliminates the need for the additional buffer registers and memory select logic of the prior art memory system and greatly increases memory access speed. Further included in a preferred embodiment are a plurality of first error detection means, respectively associated with each memory module output for sending an error signal to the data processor informing the latter that an error has been detected.

In a further aspect of the invention, the gating means consists of OR-gate means, the inputs of which are respectively coupled to the corresponding bits of information from all memory modules and the output of which is coupled to the data processor. The OR-gate means operates to pass requested information when it is supplied from any or all of the memory modules.

In a still further aspect of the invention, second error detection means is coupled to the output of the OR-gate means for detecting erroneous information thereat and supplying an error signal to the data processor responsive thereto. An error signal so detected, when no errors are detected by any of the plurality of first error detection means, indicates that different information has been inadvertently stored at the same memory locations in the memory modules.

DESCRIPTION OF THE PREFERRED EMBODIMENT

Figure 2:
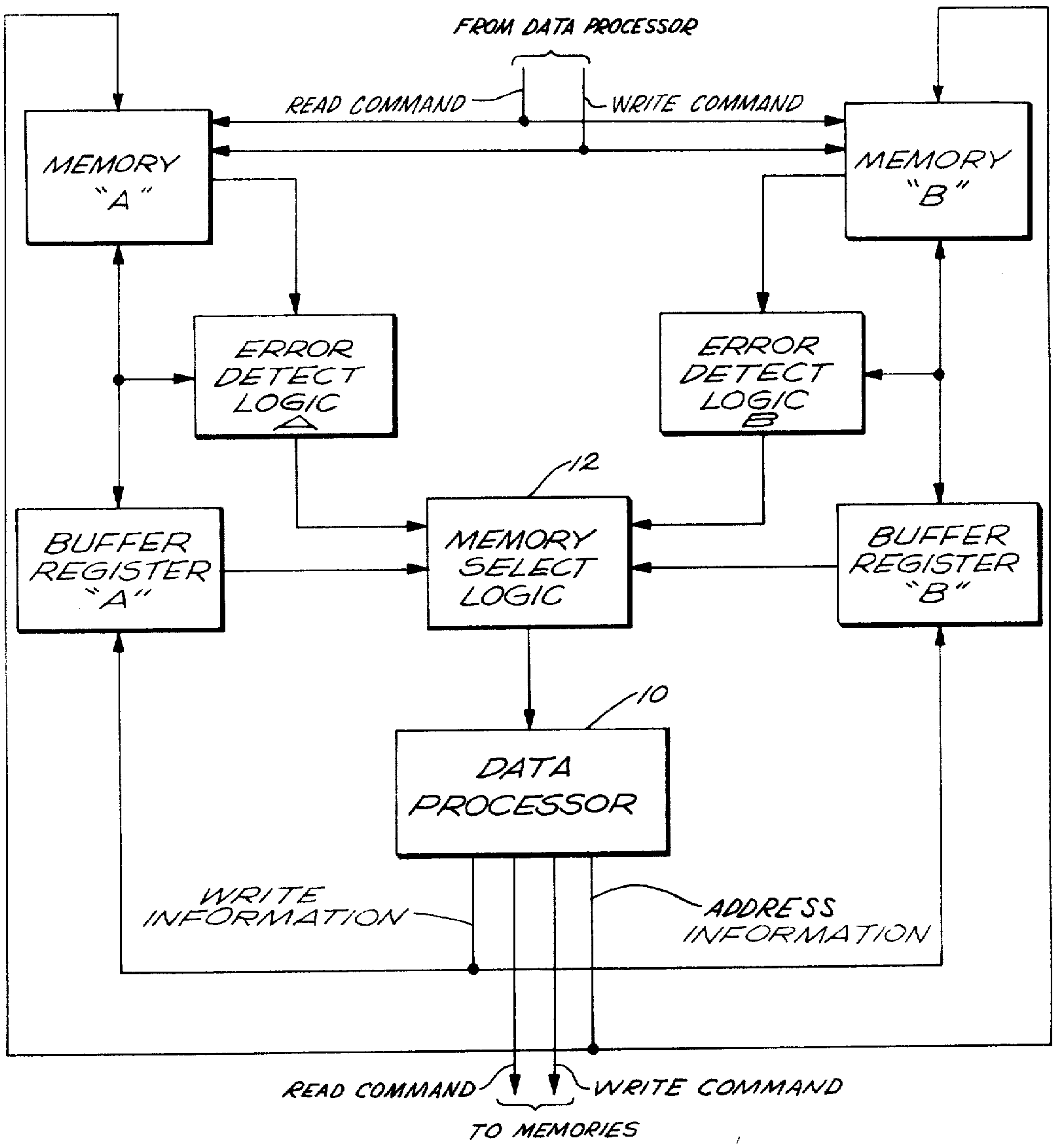
PRIOR ART FIG. 2
FIG. 2 is a block diagram representation of a prior art redundant memory system.

Referring first to FIG. 2 and the prior art redundant memory system therein disclosed, a pair of memories A and B are shown. Each of these memories contains a memory core, an address register, an information register, and control logic (all not shown) collectively referred to as a memory module. A memory module contemplated is disclosed in U.S. Pat. No. 3,200,380. In addition, each of the memories contains identical information units stored at identical or corresponding addresses. Each information unit has a plurality of binary coded bits of information. Each information unit is coded according to a preselected parity. Requests for information by data processor 10 is simultaneously made to memories A and B. Such requested information unit is then simultaneously supplied by memories A and B to their respective buffer registers A and B. The outputs from buffer registers A and B are supplied to memory select logic 12. Memory select logic 12 operates the pass the requested information from the output of only one of the buffer registers at a time, in a manner which will be hereinafter described. Error detect logic circuits A and B are respectively coupled to memories A and B. Such detection circuits perform parity checks at the outputs of their associated memories. Upon the detection of a parity error by either of the error detect logic circuits A or B, an error signal is sent therefrom to memory select logic 12. If an error is detected in the memory being used, i.e. from the buffer register output originally selected by memory select logic 12, operation immediately transfers to the other memory. Both memories are then regenerated by the buffer register of the "good" memory, thus correcting transient error. After the error detection circuits have verified that the erroneous memory has been corrected, each memory is again controlled by its own buffer register. Operation is not transferred to the previously erroneous memory until the "good" memory develops its first error.

In operation, and with reference to FIG. 2, assume that data processor 10 desires to obtain certain information. It therefore requests such information by simultaneously sending the identical memory request address to memories A and B. Memories A and B will then simultaneously transmit the word information located at such address to their respective buffer registers A and B. If no parity errors are detected by error detect logic circuits A and B, only one of the outputs from buffer registers A and B will be supplied through memory select logic 12 to data processor 10. Memory select logic 12 can be preset to normally pass only the output from either buffer register A or buffer register B. For the purposes of examining the operation of such system, assume that the normal selection by memory select logic 12 is of the output from buffer register A.

Further assume, that an error in parity has been detected in the output information from memory A by error detect logic circuit A. An error signal will be sent by error detect logic A to memory select logic 12 informing the latter that an error has been detected in the output information from memory A. This will cause memory select logic circuit 12 to cease the application of the output from buffer register A, and thus memory A, to data processor 10 and switch its operative state so as to enable the output from buffer register B, and thus memory B, to be applied to data processor 10. The failed memory A is then corrected by regenerating both memories by buffer register B of "good" memory B, thus correcting transient errors.

After error detect logic circuits A and B no longer detect any erroneous information coming from memories A and B, each memory is once again controlled by its own buffer register. Operation is not retransferred to the previously erroneous memory A until the "good" memory B develops its first error. It should be obvious, however, to those skilled in the art, that simultaneous errors in the output information from both memory A and memory B will cause complete system failure. It is desirable, therefore, to decrease the possibility of such complete system failure.

Figure 1:
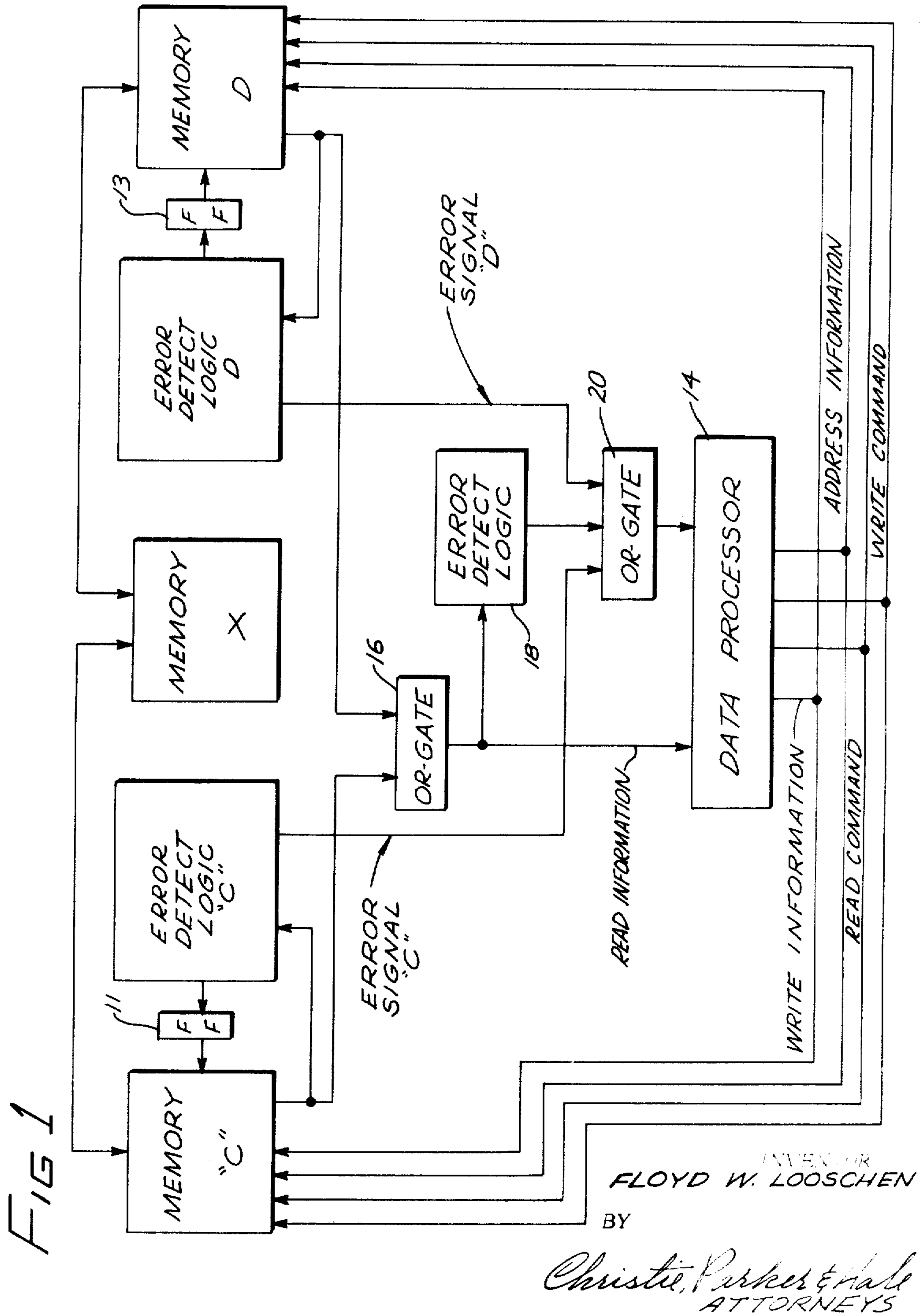
FIG. 1 is a block diagram representation of the redundant memory system according to the present invention.

The redundant memory system according to the present invention, and disclosed in FIG. 1, utilizes a plurality of memories C and D (only two being shown for purposes of example), each of the plurality of memories containing identical information stored at identical or corresponding addresses. The number of redundant memories can be two or more, depending on the desired mean time between failures, i.e. the greater the number of memories, the lower the possibility of complete system failure. A data processor 14 simultaneously requests desired information at identical addresses from memories C and D and any others connected in the system. Such requested information is supplied by all memories to the corresponding input terminals C and D of OR-gate 16. OR-gate 16 operates to pass the requested information, when such information is received from any or all of the plurality of memories. The requested information passed by OR-gate 16 is supplied directly to data processor 14.

Associated with each memory is an error detection logic circuit (C and D in the example of FIG. 1). These error detection circuits are parity check circuits which check the output information supplied from their respective memories and, upon detection of an error therein, e.g. parity error, send an error signal to respective flip-flop circuits (11 and 13 shown in FIG. 1) which store such signal and cause the control logic circuitry of each memory (FIG. 3) to disable and keep disabled such memory for as long as the error signal remains stored in the respective flip-flop. Error detect logic circuit C and D further operate, upon detection of errors in the output information from their associated memories, to send an error signal to data processor 14 informing the latter that an error has been detected.

At this point, it might be helpful to point out the fact that the information from the memories are binary coded digital bits which appear in parallel at the respective outputs. Furthermore, parity check logic circuits for performing error checks of digital signals are well known in the art. One of the types contemplated is disclosed on page 62, FIG. 4.6 of the book Error Detect Logic for Digital Computers published in 1968 by McGraw-Hill Book Company. The circuits of FIG. 4.6 are cascaded to accommodate the desired number of bits in an information unit.

Error detect logic circuit 18, a parity check circuit of the same type as error detect logic C and D, is coupled to the output of OR-gate 16 and operates to error check the information at such output being supplied to data processor 14. Such error detect logic circuit, having the sole function of producing an error signal responsive to the detection of an error, is also well known in the art. Upon the detection of an error in such output information, error detect logic circuit 18 transmits an error signal to the data processor informing the latter that an error has been detected at the output of OR-gate 16. Thus, an error detected at such output, but not at any of the outputs of the memories means that different information has been inadvertently stored at the same memory location in the memories.

An additional OR-gate 20 couples all of the error signals supplied from error detect logic circuits C, D and 18 to the data processor. OR-gate 20 operates to transmit an error signal to data processor 14 upon its receipt of an error signal from any or all of the error detect logic circuits. Data processor 14, upon the receipt of such an error signal through OR-gate 20, may be programmed or otherwise controlled to re-request the originally requested information simultaneously from each of the memories of which the disabled memory does not respond because of the continuing disable signal from flip-flop 11. It is commonplace to program a computer or otherwise provide fixed control logic therein which responds to a parity error in information to reread the same information. One type of system contemplated which has this feature is the electronic switching system of the Bell Telephone System. This feature is disclosed in the Bell System Technical Journal, Vol. XLIII, No. 5, Part 1, September, 1964 (page 1980). The use of an independent memory X in re-enabling and updating disabled memories will be hereafter described.

In operation, and with reference to the preferred embodiment of the invention disclosed in FIG. 1, assume that certain information is required by data processor 14. Data processor 14 then requests such information simultaneously from memories C and D by sending out the identical or corresponding memory request addresses since each of the memories has identical information stored at identical or corresponding addresses. The requested information will then be simultaneously supplied from memories C and D to the corresponding input terminals of OR-gate 16. During this time, error detect logic circuits C and D are parity checking the information contained in the output from their associated memories.

Assume that a parity error is detected in the output from memory C. For example, assume an even parity bit checking system is utilized where the requested word should be 1111 (the last bit being the parity bit) and where the actual information supplied from memory C is the word 1101. Since an odd number of "1"'s will be detected by error detect logic circuit C, such logic circuit C will transmit an error signal to one of the inputs of OR-gate 20. In addition, error detect logic circuit C will transmit an error signal to flip-flop 11 where it will be stored. The control logic C and D are conventional circuits used with core memories to generate read, write and strobe control signals responsive to the READ and WRITE commands. The error signal stored in flip-flop 11 is coupled to control logic C (FIG. 3) and causes control logic C to disable memory C from further reading of information and hence preventing further transmission of information to OR-gate 16 and thus to data processor 14.

Assume that the word information emanating from the output of memory D is 1111, i.e. there being no parity error. Error detect logic circuit D, therefore, will send no error signal to OR-gate 20 and will not cause control logic D (FIG. 3) to disable memory D from supplying such word information through OR-gate 16. The information arriving at OR-gate 16, therefore, will be the erroneous word 1101 from memory C and the correct word 1111 from memory D. The output from OR-gate 16 will contain, therefore, the coded word 1111, which is the correct word originally requested by data processor 14. This being the case, error detect logic circuit 18 will sense no parity error and thus will not supply an error signal to its respective input of OR-gate 20. What will be arriving, therefore, at the inputs of OR-gate 20, will be solely an error signal from error detect logic circuit C. OR-gate 20 will operate to pass such error signal.

Data processor 14, upon the receipt of the error signal supplied from the output of OR-gate 20, may be programmed or otherwise controlled to re-request the originally requested information, i.e. 1111, simultaneously from memories C and D. Memory C, however, will not respond since it has been disabled by its associated control logic circuit C in response to the storage of an error signal in flip-flop 11. From this point on, and until memory C is repaired, updated and enabled by the resetting of flip-flop 11, only memory D will supply requested information to data processor 14. The operation of error detect logic D, associated error flip-flop FF13 and control logic D in response to an information error detected by error detect logic D is essentially the same as that described above for error detect logic C, flip-flop 11 and control logic C.

A repaired memory, originally disabled by its associated error detection logic circuit, may be returned to the system by a procedure which is initiated manually or automatically by the processor. Such procedure consists of the following steps:

Step 1. Inhibit further changes to the plurality of memories, and with the repaired memory still disabled, read all of the data from any of the still enabled memories to an independent and distinct memory (memory X in FIG. 1) not associated with the redundant memory system per se.

Step 2. Enable the repaired memory.

Step 3. Copy all of the data from the independent and distinct memory to all of the plurality of redundant memories, thereby restoring the plurality of memories to identical data and history condition.

Step 4. Resume normal operation.

Figure 3:
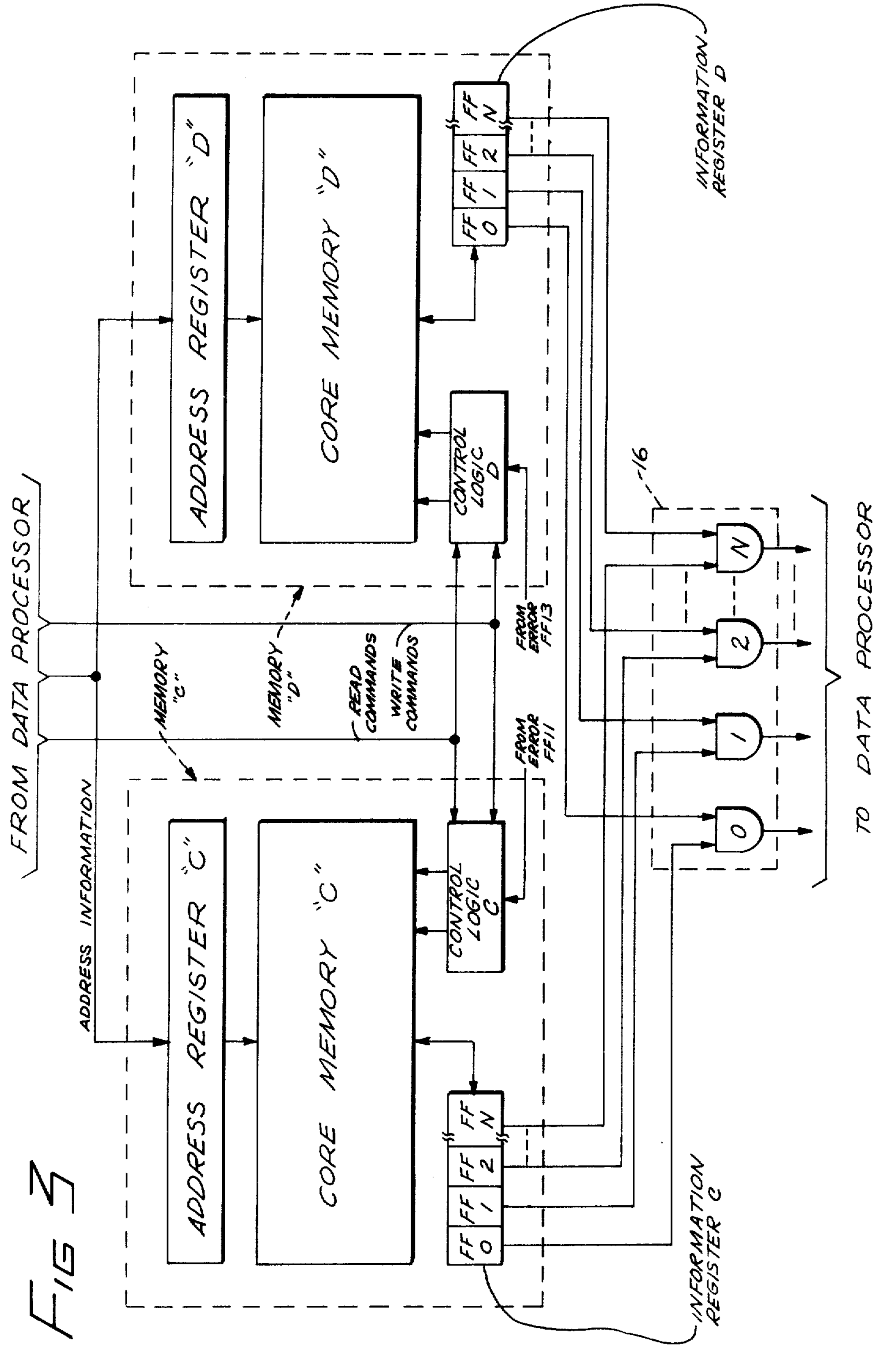
FIG. 3 is a partial block and partial schematic diagram representation of the memories A and B and the OR-gate 16 of FIG. 1.

FIG. 3 is a more detailed representation of memories C and D and OR-gate 16. Each memory contains address and information registers C and D, respectively, core memories C and D, respectively, and control logic C and D, respectively.

The information registers C and D are further broken down to indicate that each contains a plurality of flip-flop circuits 0 through N (only flip-flops 0, 1, 2, and N being shown). Each of the flip-flops are responsible for each bit in a coded word stored in the core memories, requested by data processor 14, and being supplied thereto through OR-gate 16. OR-gate 16 consists of a plurality of individual OR-gates, corresponding in number to the number of flip-flop circuits contained in each of information registers C and D.

Assume that the word requested to be supplied from memories C and D is 1010 - - - 0. The corresponding address request is therefore sent by data processor simultaneously to address registers C and D of memories C and D. Correspondingly, read commands are simultaneously sent to control logic C and D, which operate to enable the reading from the core memories C and D, respectively. Since the memories contain identical information stored at identical addresses, each memory will transmit the same word information, i.e. 101 - - - O, if there are no errors. OR-gate 1 of 16, receiving at its inputs a "1" from flip-flop 0 of information register C and a "1" from flip-flop 0 of information register D will transmit a "1" from its output; OR-gate 1, receiving at its input a "0" from flip-flop 1 of information register C and a "0" from flip-flop 1 of information register D will transmit a "0" from its output; and OR-gate 2 receiving at its input a "1" from flip-flop 2 of information register C and a "1" from flip-flop 2 of information register D will transmit a "1" at its output, etc. Data processor 14, therefore, will receive the requested word 1010 - - - 0 from OR-gate 16.

Let us assume, by way of further example, that a parity error is detected at the output of memory C by its associated error detection logic circuit C, e.g. a 1110 - - - O was sent. The error detection logic C will set the error flip-flop FF11 causing a corresponding signal to be applied to the control logic C. With this the case, the associated control logic C will disable the memory C from further reading and writing and hence from communicating any information to data processor 14 through OR-gate 16. The only information arriving at OR-gates 0, 1, 2, etc. will be that which is supplied from memory D.

As a final example, assume that different information words 1010 - - - O and 0110 - - - O have been inadvertently stored at the same addresses in memories C and D. With this the case, no parity errors will be detected at the memory outputs by error detect circuits C and D, i.e., both words have an even number of 1's. Therefore, error detect logic circuits C and D will not disable their respective memories and will not transmit error signals to data processor 14. Arriving at OR-gate 0, therefore, in OR-gate 16 will be a "1"-bit transmitted by OR-gate 0 in information register C and a "0"-bit transmitted by OR-gate O in information register D. OR-gate 0 in OR-gate 16, therefore, will pass a "1" bit. Similarly, OR-gates 1 and 2 in OR-gate 16 will each pass one bits. The information thus supplied by OR-gate 16 will be the word 1110 - - - O which has an odd number of 1's. Error detect logic circuit 18 (FIG. 1) will detect such parity error which indicates, since no parity errors were detected at the outputs from memories C and D, that different information has been inadvertently stored at the same address locations in such memories.

What has been disclosed, therefore, is a redundant memory system substantially eliminating inherent disadvantages of prior art redundant memory system disclosed and described with reference to FIG. 2. Buffer registers A and B of that system, as well as memory select logic 12, have been eliminated and replaced by OR-gate 16 which supplies requested information directly from the memories to the data processor. The elimination of such buffer registers greatly increases memory access speed. In addition, the invention is not limited to the use of two redundant memories, as in the prior art. Any number of redundant memories may be used, the greater the number of memories, the lower the possibility of complete system failure. All that would have to be done in increasing the number of redundant memories would be to update such additional memories with information identical with the presently stored information in the memories, previously in use in the system, and to store such information at identical or corresponding addresses. Also, the output for each bit from each of the added memories would have to be applied to corresponding "OR" gates of OR-gate 16 (FIGS. 1 and 3). Finally, additional associated error detect logic circuits would have to be operatively connected with each added memory, an output from each such error detect logic circuit being applied to OR-gate 20 (FIG. 1).

Additionally, the redundant memory system of the present invention contains means for detecting when different information is stored at the same or corresponding addresses in the redundant memories. In other words, a parity error detected by error detect logic circuit 18 without any parity errors detected by error detect logic circuits C and D indicates that different information is stored at the same addresses in the plurality of memories.

What is claimed is:

1. In an error checking redundant memory system comprising:

multiple addressable memory modules, each with multiple memory locations, corresponding memory locations in each memory module having identical information units composed of binary coded bits stored therein and coded according to a preselected parity, the memory modules each having an output at which the bits of an information unit therefrom are presented simultaneously; and apparatus for reading out an information unit from corresponding memory locations in all memory modules and for detecting an error in parity comprising:

means for addressing each of said memory modules selecting the corresponding memory locations in each memory module, means for enabling each of said memory modules to simultaneously read out an information unit from the addressed memory location, and simultaneously present the bits of the information unit at the corresponding output, an "OR" gating circuit for simultaneously "OR"ing together the corresponding bits in the information units from the outputs of all memory modules to produce a single output information unit, a parity check circuit for each memory module for indicating an error in parity of an information unit from the corresponding memory module, and means responsive to an error indication from a parity check circuit for disabling the corresponding memory module from presenting further information units to the "OR" gating circuit.

2. The system of claim 1 wherein the disabling means comprises a plurality of storage devices, each respectively associated with a different one of the plurality of parity check circuits, each said storage device responding to the detection of an error by the associated error check circuit for applying and maintaining a corresponding signal to the associated memory module, the associated memory module comprising control means responsive to the applied signal for disabling such memory module, from presenting further information units to the "OR" gating circuit.

3. A system according to claim 1 comprising a further parity check circuit for indicating an error in parity of an information unit from the "OR" gating circuit.

4. In a data processing system having an error checking redundant memory system, the data processing system comprising:

multiple addressable memory modules, each with multiple memory locations, corresponding memory locations in each memory module having identical information units composed of binary coded bits stored therein and coded according to a preselected parity, the memory modules each having an output at which the bits of an information unit therefrom are presented simultaneously;

a data processor comprising:

means for addressing each of said memory modules selecting the corresponding memory locations in each memory module, and means for enabling each of said memory modules to simultaneously read out an information unit from the addressed memory location, and simultaneously present the bits of the information unit at the corresponding output;

an "OR"gating circuit for simultaneously "OR"ing together the corresponding bits in the information units from the outputs of all memory modules for producing a single output information unit to said data processor;

means for indicating an error in parity of one of said information units comprising a parity check circuit for each memory module for indicating an error in parity from the corresponding memory module; and means responsive to an indication from a parity check circuit for disabling the corresponding memory module from providing further information units.

5. The system of claim 4 wherein the disabling means comprises a plurality of storage devices, each respectively associated with a different one of the plurality of parity check circuits, each said storage device responding to the detection of an error by the associated error check circuit for applying and maintaining a corresponding signal to the associated memory module, the associated memory module comprising control means responsive to the applied signal for disabling such memory module, from presenting further information units to the "OR" gating circuit.

6. A system according to claim 4 comprising a further parity check circuit for indicating an error in parity of an information unit from the "OR" gating circuit.

7. The system of claim 5 comprising means for coupling an indication of a parity error from any one of said parity check circuit to said data processor.

8. The system of claim 7 wherein said data processor is operative upon receipt of a parity error for readdressing and re-enabling each of said memory modules at the same address.

* * * * *